(12) United States Patent
Roper et al.

(10) Patent No.: US 8,708,309 B2
(45) Date of Patent: Apr. 29, 2014

(54) SELF-ALIGNING SPRING SEAT FOR FLUID REGULATOR AND FLUID REGULATOR COMPRISING SELF-ALIGNING SPRING SEAT

(75) Inventors: Daniel G. Roper, Lucas, TX (US); Douglas J. Scheffler, McKinney, TX (US); Harold J. McKinney, Durant, OK (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 305 days.

(21) Appl. No.: 12/764,712

(22) Filed: Apr. 21, 2010

(65) Prior Publication Data

US 2010/0269925 A1    Oct. 28, 2010

Related U.S. Application Data

(60) Provisional application No. 61/173,013, filed on Apr. 27, 2009.

(51) Int. Cl.
*F01L 3/10* (2006.01)

(52) U.S. Cl.
USPC ............ 251/337; 251/61.2; 251/84; 251/63.5

(58) Field of Classification Search
USPC ................. 251/61.2–61.5, 337, 84–88, 63.5; 267/170, 179
See application file for complete search history.

(56) References Cited

U.S. PATENT DOCUMENTS

| 2,492,465 | A |   | 12/1949 | Dahl |
|-----------|---|---|---------|------|
| 3,556,125 | A |   | 1/1971  | Dowdall |
| 5,279,327 | A | * | 1/1994  | Alsobrooks et al. .......... 137/510 |
| 5,381,816 | A | * | 1/1995  | Alsobrooks et al. ....... 137/15.22 |
| 6,260,836 | B1 | * | 7/2001 | Aoyama et al. ............... 267/221 |
| 6,883,651 | B2 | * | 4/2005 | Fukaya .................... 188/322.12 |
| 7,111,823 | B2 | * | 9/2006 | Hansen ........................ 251/355 |

(Continued)

FOREIGN PATENT DOCUMENTS

| CN | 101149118 A | 3/2008 |
| DE | 17 50 118 A1 | 1/1971 |
| EP | 1 260 744 A1 | 11/2002 |
| JP | 2008-101765 | 5/2008 |

OTHER PUBLICATIONS

International Search Report for International Application No. PCT/US2010/031901, dated Aug. 5, 2010.

(Continued)

*Primary Examiner* — Eric Keasel
*Assistant Examiner* — David Colon Morales
(74) *Attorney, Agent, or Firm* — Marshall, Gerstein & Borun LLP (57) ABSTRACT

A spring seat for self aligning a bias-open or bias-close spring is disposed within a tubular control element of a gas regulator and designed to reduce side loading of the spring, which can cause the spring to prematurely fail. The spring seat can comprise a spring seat adaptor and a seat ring. The spring seat adaptor is fixed inside of the tubular control element and the seat ring is movably mounted on the spring seat adaptor via a ball and socket type joint. The movable seat ring is engaged by the spring and adapted to be self-aligned through three-dimensional displacement relative to the spring seat adaptor via the ball and socket joint.

4 Claims, 4 Drawing Sheets

(56) References Cited

U.S. PATENT DOCUMENTS

2006/0219966 A1* 10/2006 Zecchi et al. ............... 251/61.2
2008/0067464 A1* 3/2008 Arai et al. ................... 251/319
2008/0078460 A1* 4/2008 Roper et al. ................. 137/540

OTHER PUBLICATIONS

Written Opinion for International Application No. PCT/US2010/031901, dated Aug. 5, 2010.

International Preliminary Report on Patentability for International Application No. PCT/US2010/031901, dated Nov. 1, 2011.

Office Action for Chinese Patent Application No. 201080018568.6, dated Jan. 29, 2013.

Office Action for Japanese Patent Application No. 2012-507353, dated Feb. 5, 2014.

Office Action for Russian Patent Application No. 2011145892, dated Jan. 9, 2014.

* cited by examiner

SELF-ALIGNING SPRING SEAT FOR FLUID REGULATOR AND FLUID REGULATOR COMPRISING SELF-ALIGNING SPRING SEAT

CROSS-REFERENCE TO RELATED APPLICATION

The priority benefit of U.S. Provisional Application No. 61/173,013, filed Apr. 27, 2009, is hereby claimed and the entire contents thereof are incorporated herein by reference.

FIELD OF THE DISCLOSURE

The present disclosure generally relates to a fluid control device and, more particularly, to a fluid control device including a positioning device and a positioning device for a fluid control device.

BACKGROUND

Figure 1:
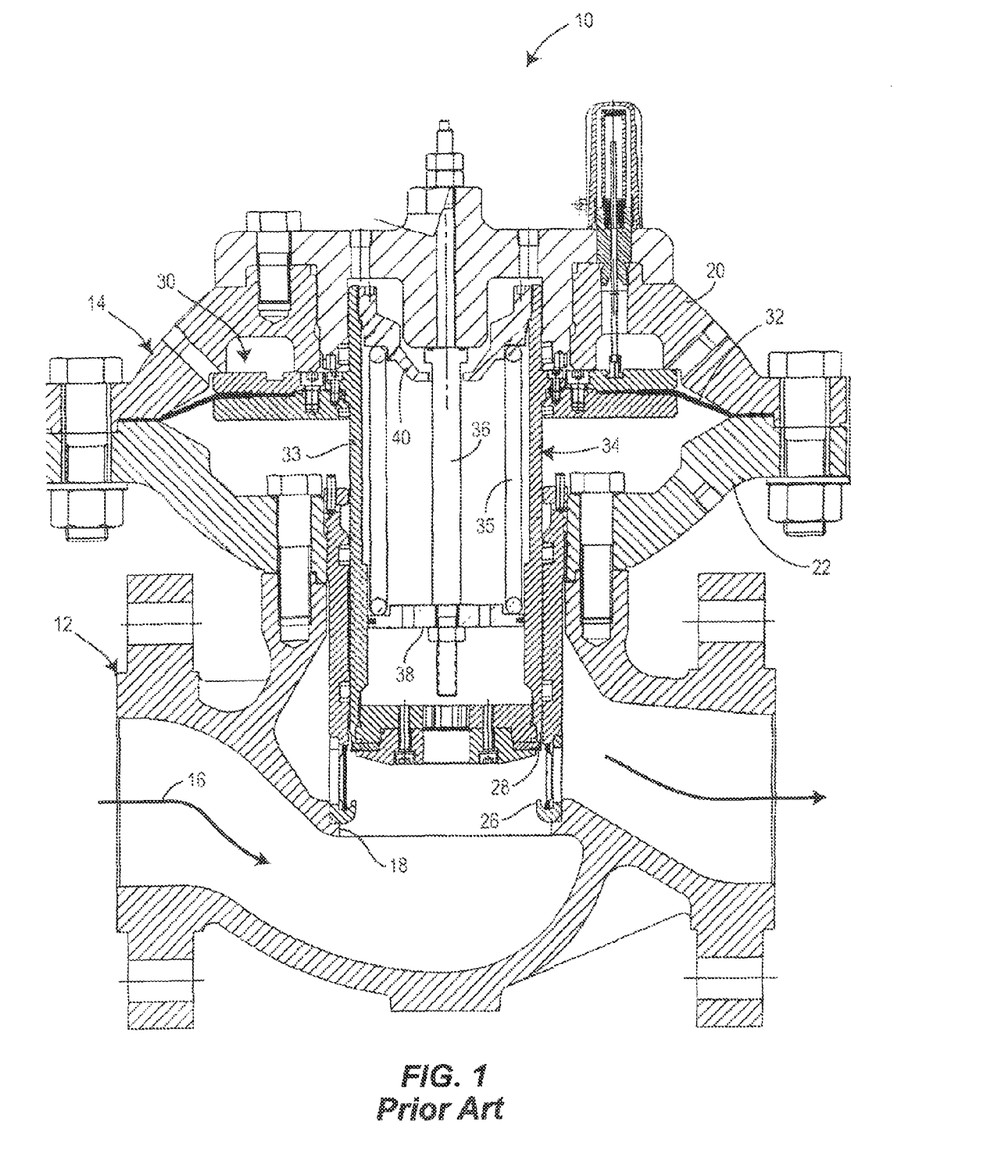
FIG. 1 is a cross-sectional side view of a conventional regulator.

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known regulator 10 including a valve body 12 and an actuator 14. The valve body 12 defines a flow-path 16 and includes a throat 18. In FIG. 1, the regulator 10 is configured in a flow-up configuration. The actuator 14 includes an upper actuator casing 20, a lower actuator casing 22, a diaphragm subassembly 30 including a diaphragm 32, and a positioning device assembly 34.

The positioning device assembly 34 includes a tubular control member 33, a coil spring 35, a central rod 36, a first spring seat 38, and a second spring seat 40. The tubular control member 33 is disposed within the upper and lower actuator casings 20, 22 and is adapted for bi-directional displacement in response to changes in pressure across the diaphragm subassembly 30. So configured, the tubular control member 33 controls the flow of fluid through the throat 18 of the valve body 12. Additionally, as is depicted, the regulator 10 includes a seat ring 26 disposed in the throat 18 of the valve body 12. When the outlet pressure of the valve body 12 is high, a sealing surface 28 of the positioning device assembly 34 may sealingly engage the seat ring 26 and close the throat 18. Similarly, absent any pressure in the actuator 14 or upon the failure of the diaphragm 32, the coil spring 35, which is carried by the central rod 36, and disposed within the tubular control member 33 biases the tubular control member 33 into an open position, which is illustrated in FIG. 1.

Figure 2:
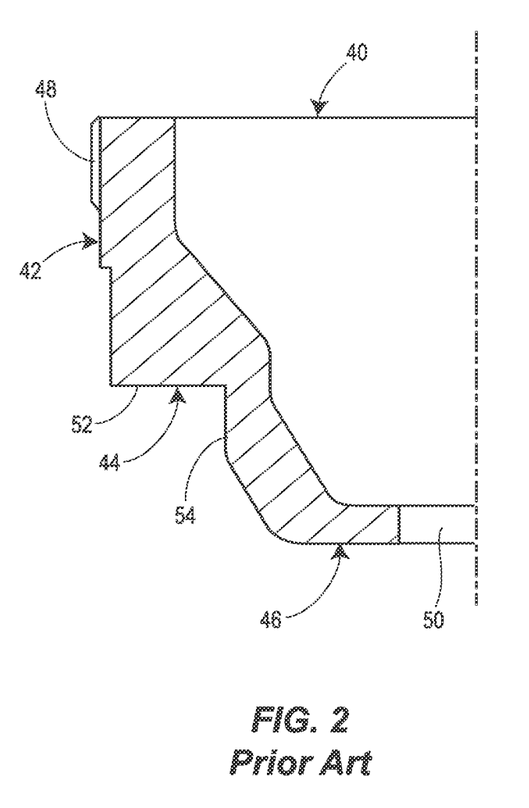
FIG. 2 is a detailed partial cross-sectional view of a spring seat of the conventional regulator of FIG. 1.

Still referring to FIG. 1, the coil spring 35 of the conventional regulator 10 is carried by the central rod 36 between the first spring seat 38 and the second spring seat 40. The first spring seat 38 generally comprises a flat plate that is fixedly coupled to the central rod 36. The second spring seat 40 includes a more complex structure that is fixedly coupled to an inner wall of the tubular control member 33. Typically, the second spring seat 40 is threadably coupled to the inner wall of the tubular control member 33. As depicted in FIG. 2, the second spring seat 40 comprises a one-piece member having a complex geometrical cross-section for seating and aligning the spring 35 in the tubular control member 33.

Specifically, the second spring seat 40 of the regulator 10 depicted in FIG. 2 includes a cross-sectional geometry that generally resembles a modified conical or triangular shape including a fixation portion 42, a seating portion 44, and a rod receiving portion 46. The fixation portion 42 includes a plurality of external threads 48 that threadably connect the second spring seat 40 to the tubular control member 33. The rod receiving portion 46 defines an aperture 50 for receiving the central rod 36 (as shown in FIG. 1) such that the tubular control member 33 and second spring seat 40 can move relative to the central rod 36 during operation of the regulator 10.

The seating portion 44 of the second spring seat 40 is disposed between the fixation portion 42 and the rod receiving portion 46 and is adapted to be engaged by an end of the spring 35. Specifically, the seating portion 44 includes a generally horizontal seating surface 52 and an alignment surface 54. As illustrated in FIG. 1, an end of the spring 35 seats against the seating surface 52 and an inner side of the spring 35 is disposed adjacent to and/or in contact with the alignment surface 54. So configured, the seating portion 44 of the second spring seat 40 operates to support and align the spring 35 within the tubular control member 33.

During operation, the tubular control member 33 and the second spring seat 40 move relative to the central rod 36 in response to changes in pressure across the diaphragm assembly 30. This movement causes the spring 35 to cyclically expand and compress with the movement of the tubular control member 33. However, expansion and compression of the spring 35 can result in misalignment of the first spring seat 38 relative to the tubular control member 33. This misalignment can be the result of imperfections present in the manufacturing of such springs. These imperfections can cause uneven perimeter loading of the spring 35, which can cause the spring 35 to shift laterally and contact the inner wall of the tubular control member 33 and/or push the first spring seat 38 laterally into the inner wall of the tubular control member 33. This phenomenon is generally referred to as side loading and it can cause the spring 35 and/or the first spring seat 38 to wear prematurely and/or fail. This problem is exacerbated when the spring 35 comprises a large, high rate spring that generates substantial loads.

SUMMARY

One aspect of the present disclosure provides a positioning device assembly for regulating the flow of a fluid through a fluid flow-path of a regulator. The positioning device assembly comprises a tubular control member, a central rod, a first spring seat, a second spring seat, and a spring. The central rod is disposed at least partly within the tubular control member and is adapted to be fixed to a casing of the regulator. The first spring seat is disposed within the tubular control member and is fixed relative to the central rod. The second spring seat is at least partly disposed within the tubular control member and defines an opening through which the central rod extends. The spring is disposed between the first and second spring seats, and adapted to bias the tubular control member into a predetermined position relative to the casing of the regulator. The second spring seat comprises a spring seat adaptor fixed relative to the control member and a seat ring engaging the spring and adapted for displacement relative to the spring seat adaptor to thereby self-align the spring within the tubular control member.

In some embodiments, the seat ring articulates relative to the spring seat adaptor.

In some embodiments, the second spring seat comprises a ball and socket type joint between the spring seat adaptor and the seat ring such that the seat ring can articulate relative to the spring seat adaptor.

In some embodiments, the spring seat adaptor comprises a partial spherical convex surface and the seat ring engages the partial spherical convex surface of the spring seat adaptor.

In some embodiments, the seat ring comprises partial spherical concave surface engaging the partial spherical convex surface of the spring seat adaptor.

In some embodiments, the assembly further comprises a nylon guide ring disposed between the first spring seat and an internal surface of the tubular control member, the nylon guide ring facilitating movement between the first spring seat and the tubular control member.

Another aspect of the present disclosure is directed to a positioning device assembly for regulating the flow of a fluid through a fluid flow-path of a regulator. The positioning device assembly comprises a tubular control member, a central rod, a first spring seat, a second spring seat, and a spring. The central rod is disposed at least partly within the tubular control member and adapted to be fixed to a casing of the regulator. The first spring seat is disposed within the tubular control member and fixed relative to the central rod. The second spring seat is at least partly disposed within the tubular control member, and defines a convex external surface and an opening through which the central rod extends. The spring is disposed between the first and second spring seats, and adapted to bias the tubular control member into a predetermined position relative to the casing of the regulator. The spring has a portion that is in engagement with the second spring seat, and which is movably disposed relative to the convex external surface to thereby self-align the spring within the tubular control element.

In some embodiments, the portion of the spring in engagement with the second spring seat articulates relative to the convex external surface.

In some embodiments, the second spring seat defines a ball and socket type joint that can articulate.

In some embodiments, the second spring seat comprises a spring seat adaptor fixed relative to the control member and carrying the convex external surface, and a seat ring disposed between the spring seat adaptor and the spring, the seat ring movably engaging the convex external surface thereby facilitating self-alignment the spring within the tubular control member.

In some embodiments, the spring seat adaptor of the second spring seat is threadably coupled to the tubular control member.

In some embodiments, the convex external surface of the spring seat adaptor comprises a partial spherical convex surface and the seat ring engages the partial spherical convex surface of the spring seat adaptor.

In some embodiments, the seat ring comprises partial spherical concave surface engaging the partial spherical convex surface of the spring seat adaptor.

In some embodiments, the assembly can further comprise a nylon guide ring disposed between the first spring seat and an internal surface of the tubular control member, the nylon guide ring facilitating movement between the first spring seat and the tubular control member.

Another aspect of the present disclosure is directed to a regulator comprising a valve body, an actuator casing, a tubular control element, a central rod, a first spring seat, a second spring seat, and a spring. The valve body defines a flow-path for a fluid. The actuator casing is coupled to the valve body. The tubular control member is at least partly disposed within the actuator casing and adapted for displacement relative to the valve body for regulating a flow of the fluid through the flow-path. The central rod is disposed at least partly within the tubular control member and fixed to the actuator casing. The first spring seat is disposed within the tubular control member and fixed relative to the central rod. The second spring seat is at least partly disposed within the tubular control member and defining an opening through which the central rod extends. The spring is disposed between the first and second spring seats, and biases the tubular control member into a predetermined position relative to the actuator casing. The second spring seat comprises a spring seat adaptor fixed relative to the tubular control member and a seat ring engaging the spring and adapted for displacement relative to the spring seat adaptor to thereby self-align the spring within the tubular control member.

In some embodiments, the seat ring articulates relative to the spring seat adaptor.

In some embodiments, the second spring seat comprises a ball and socket type joint between the spring seat adaptor and the seat ring such that the seat ring can articulate relative to the spring seat adaptor.

In some embodiments, the spring seat adaptor comprises a partial spherical convex surface and the seat ring engages the partial spherical convex surface of the spring seat adaptor.

In some embodiments, the seat ring comprises partial spherical concave surface engaging the partial spherical convex surface of the spring seat adaptor.

In some embodiments, the assembly further comprises a nylon guide ring disposed between the first spring seat and an internal surface of the tubular control member, the nylon guide ring facilitating movement between the first spring seat and the tubular control member.

DETAILED DESCRIPTION

Figure 3:
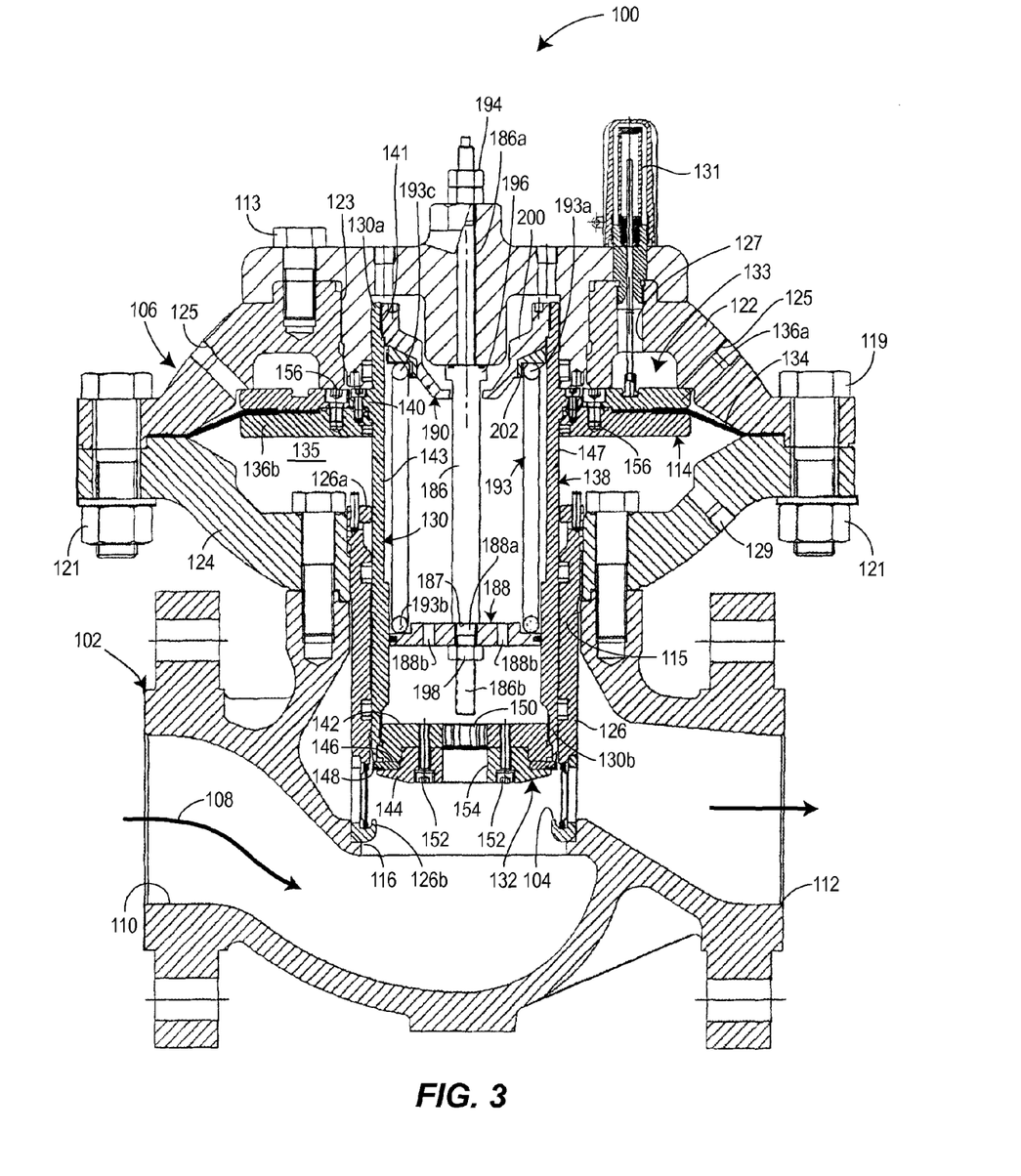
FIG. 3 is a cross-sectional side view of a regulator constructed in accordance with the present disclosure.

Referring to FIG. 3, one embodiment of a control device constructed in accordance with the principles of the present disclosure includes a pressure regulator 100. The pressure regulator 100 generally includes a valve body 102 and an actuator 106. The valve body 102 defines a flow-path 108 extending between an inlet 110 and an outlet 112, as well as into the actuator 106, as will be discussed. The actuator 106 includes a control assembly 114 that is moveable between an open position, as is shown in FIG. 3, and a closed position (not shown), wherein the control assembly 114 engages a seat ring 104 disposed within a throat 116 of the valve body 102. Movement of the control assembly 114 occurs in response to fluctuations in the pressure of the fluid at the inlet 110 and outlet 112. Accordingly, the position of the control assembly 114 relative to the seat ring 104 affects a flow capacity of the pressure regulator 100.

The actuator 106, as stated above, includes the control assembly 114 and additionally, an upper actuator casing 122, a lower actuator casing 124, and a cage 126. The upper and lower actuator casings 122, 124 are secured together by at least one threaded fastener 119 and corresponding nut 121. The upper actuator casing 122 defines a central opening 123, at least one first control inlet 125, and a travel chamber 127. The travel chamber 127 contains a travel indicator 131, which indicates the position of the control assembly 114 within the actuator 106. The lower actuator casing 124 defines at least one second control inlet 129. The control opening 123 receives a cap plate 117, which is secured to the upper actuator casing 122 by at least one threaded fastener 113.

In cooperation, the upper and lower actuator casings 122, 124 define a cavity 135 in communication with an actuator opening 115 in the valve body 102. As identified in FIG. 3, the cage 126 of the actuator 106 has a first end 126a extending into the cavity 135 and a second end 126b defining the seat ring 104.

Still referring to FIG. 3, the control assembly 114 includes a diaphragm subassembly 133 and a positioning device assembly 138. The positioning device assembly 138 includes a tubular control member 130, a mounting subassembly 132, a central rod 186, a first spring seat 188, a second spring seat 190, and a coil spring 193.

The tubular control member 130 has a generally cylindrical inner surface 143 and a generally cylindrical outer surface 147. The inner surface 143 defines a central bore through the tubular control member 130. Additionally, the tubular control member 130 includes an upper end 130a and a lower end 130b. The upper end 130a is disposed within the cavity 135 of the actuator 106 and the lower end 130b is disposed within the cage 126. The upper end 130a of the tubular control member 130 is open and includes a circumferential flange 140 formed on the outer surface 147. Additionally, the upper portion 130a of the tubular control member 130 includes a threaded portion 141 on the inner surface 143. The lower end 130b of the tubular control member 130 is open and accommodates the mounting subassembly 132.

The mounting subassembly 132 includes a mounting member 142, a disk retainer 144, a disk holder 146, and a sealing disk 148. In the disclosed form, the mounting member 142 includes a generally cylindrical body threaded into the open lower end 130b of the tubular control member 130 and defining a through-bore 150. The through-bore 150 is generally axially aligned with the tubular control member 130. The disk retainer 144 includes a generally cylindrical body fixed to the mounting member 142 with a pair of fasteners 152. In the form illustrated, the fasteners 152 include threaded fasteners. Similar to the mounting member 142, the disk retainer 144 defines a through-bore 154. The through-bore 154 of the disk retainer 144 has a diameter substantially identical to a diameter of the through-bore 150 in the mounting member 142 and is axially aligned therewith.

As depicted, the disk retainer 144 secures the disk holder 146 and the sealing disk 148 to the mounting member 142 of the retainer assembly 132. The disk holder 146 includes a generally ring-shaped plate constructed of a rigid material such as steel. The sealing disk 148 includes a generally ring-shaped disk made of a resilient material and fixed to the disk holder 146. In one form, the sealing disk 148 is fixed to the disk holder 146 with an adhesive. In accordance with the disclosed form, the configuration of the disk retainer 144 limits radial deformation of the sealing disk 148 when the control assembly 114 is in a closed position and compressing the sealing disk 148 against the seat ring 104.

Referring now to the upper portion of the regulator 100 depicted in FIG. 3, the diaphragm subassembly 133 includes a diaphragm 134, an upper diaphragm plate 136a and a lower diaphragm plate 136b. The upper and lower diaphragm plates 136a, 136b are clamped onto the circumferential flange 140 of the tubular control member 130. The diaphragm plates 136a, 136b are secured together via fasteners 156, thereby fixing the tubular control member 130 and the diaphragm plates 136a, 136b together. Additionally, the diaphragm plates 136a, 136b sandwich a radially inward portion of the diaphragm 134. A radially outward portion of the diaphragm 134 is fixed between the upper and lower actuator casings 122, 124.

The central rod 186, the first and second spring seats 188, 190, and the spring 193 of the positioning device assembly 138 are generally disposed within the tubular control member 130 to bias the tubular control member 130 into the open position depicted in FIG. 3.

The central rod 186 includes a first threaded end 186a and a second threaded end 186b. The first threaded end 186a extends through the cap plate 117 and a pair of external nuts 194 are threaded onto the first threaded end 186a to limit axial displacement of the central rod 186 in the downward direction relative to the orientation of the regulator 100 depicted in FIG. 3. The central rod 186 further includes a shoulder 196 disposed opposite the cap plate 117 from the external nuts 194 to limit axial displacement of the central rod 186 in the upward direction relative to the orientation of the regulator 100 depicted in FIG. 3. Accordingly, the first threaded end 186a of the central rod 186 is effectively fixed against axial displacement relative to the cap plate 117, actuator 106, and valve body 102, while the second threaded end 186b extends into the actuator 106.

The second threaded end 186b of the central rod 186 extends into the tubular control member 130 and is disposed adjacent the second end 130b of the tubular control member 130 for supporting the first spring seat 188. More specifically, the first spring seat 188 includes a generally flat plate that defines a central opening 188a and a plurality of apertures 188b. The plurality of apertures 188b are in fluid communication with the flow path 108 through the valve body 102 via the through-bores 150, 154 in the mounting subassembly 132 to facilitate operation of the regulator 100 in a known manner.

The central opening 188a receives the second end 186b of the central rod 186 at a location adjacent a shoulder 187 formed on the central rod 186. A retention nut 198 is threaded onto the second threaded end 186b of the central rod 186 and forces the first spring seat 188 against the shoulder 187 such that the first spring seat 188 is fixed relative to the central rod 186. As such, the first spring seat 188 is slidably disposed relative to the tubular control member 130, as will be discussed in more detail below. As illustrated, the first spring seat 188 supports a lower portion 193b of the spring 193 within the tubular control member 130, thereby positioning an upper portion 193a of the spring 193 in engagement with the second spring seat 190.

The second spring seat 190 of the disclosed embodiment includes two separate and distinct components comprising a spring seat adaptor 200 and a seat ring 202. The spring seat adaptor 200 is fixed to the tubular control member 130 and supports the seat ring 202. The seat ring 202 is disposed in engagement with the spring seat adaptor 200 and movable relative thereto to self-align the seat ring 202, which in turn self-aligns the spring 193 and the first spring seat 188 within the tubular control member 130 during assembly and operation of the regulator 100.

Figure 4:
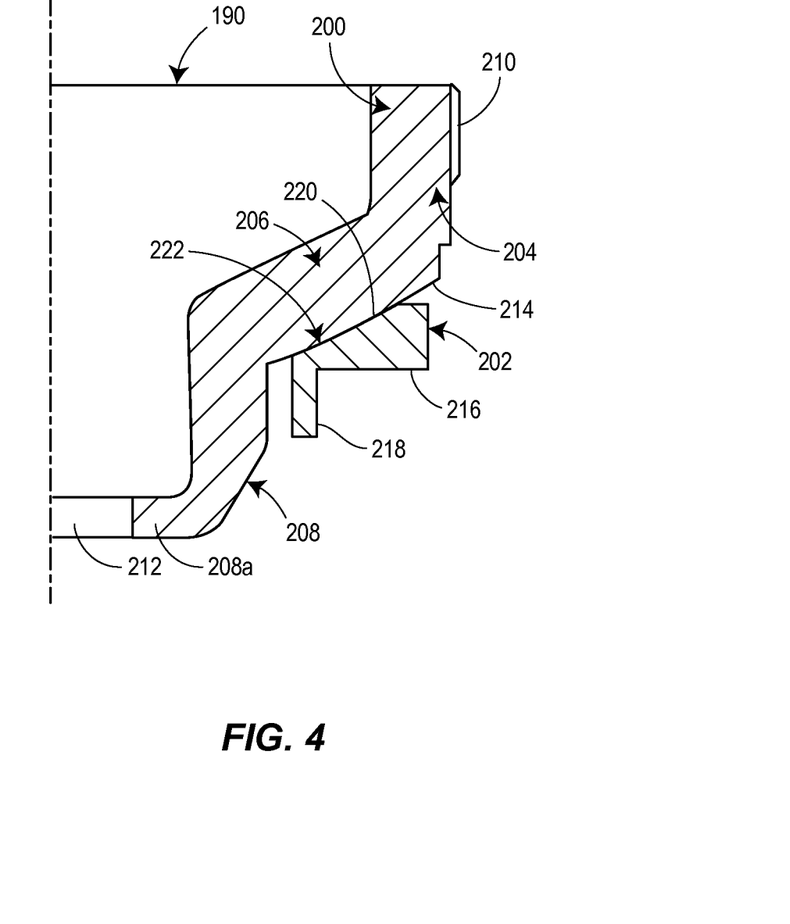
FIG. 4 is a detailed partial cross-sectional view of a spring seat of the regulator of FIG. 3.

For example, with reference to FIG. 4, one embodiment of the second spring seat 190 including the spring seat adaptor 200 and the seat ring 202, which is a separate and distinct component from the spring seat adaptor 200, is depicted in more detail.

The spring seat adaptor 200 includes a cross-sectional geometry that generally resembles a modified conical or triangular shape including a fixation portion 204, a seating portion 206, and a rod receiving portion 208. The fixation portion 204 is generally cylindrical and includes a plurality of external threads 210 that threadably connect the spring seat adaptor 200 to the plurality of threads 141 on the inner surface 143 of the tubular control member 130, as depicted in FIG. 3. The rod receiving portion 208 is also generally cylindrical and includes an end wall 208a defining an aperture 212 for receiving the central rod 186, as depicted in FIG. 3, such that the tubular control member 130 and second spring seat 190 can move relative to the central rod 186 during operation of the regulator 100.

The seating portion 206 of the second spring seat 200 is disposed between the fixation portion 204 and the rod receiving portion 208 and is adapted to be engaged by and movably support the seat ring 202, and therefore, the upper portion 193a of the spring 193 that engages the seat ring 202. Specifically, the seating portion 206 includes a wall extending at an angle between the fixation portion 204 and the rod receiving portion 208, and which defines an external surface 214 for being seated against by the seat ring 202.

The disclosed embodiment of the seat ring 202, as depicted, includes a generally L-shaped cross-section defining a seating surface 216, an alignment surface 218, and an internal surface 220. The internal surface 220 of the seat ring 202 engages the external surface 214 of the spring seat adaptor 200 and is adapted for displacement relative thereto, as will be discussed. In the disclosed embodiment, the seating and alignment surfaces 216, 218 are disposed at approximately ninety-degrees relative to each other. As illustrated in FIG. 3, the upper portion 193a of the spring 193 seats against the seating surface 216 of the seat ring 202 and an inner portion 193c of the spring 193 is disposed adjacent to and/or in contact with the alignment surface 218. So configured, the seat ring 202 of the second spring seat 190 operates to support and align the upper portion 193a of the spring 193 within the tubular control member 130, while the first spring seat 188 supports the lower portion 193b of the spring 193. So configured, the spring 193 is compressed between the first spring seat 188 and the seating surface 216 of the seat ring 202 of the second spring seat 190.

As mentioned, the seat ring 202 of the second spring seat 190 is movable relative the spring seat adaptor 200. Specifically, in the disclosed embodiment, the external surface 214 of the spring seat adaptor 200 includes a convex partial spherical surface and the internal surface 220 of the seat ring 202 includes a concave partial spherical surface. In one embodiment, the external surface 214 and internal surface 220 can have the same radius of curvature. As such, the external surface 214 and the internal surface 220 define a ball-and-socket type joint 222 between the spring seat adaptor 200 and the seat ring 202 that allows the seat ring 202 to articulate, pivot, rotate, and otherwise freely move relative to the spring seat adaptor 200.

So configured, the second spring seat 190 of the disclosed regulator 100 advantageously provides a self-aligning function to the seat ring 202, coil spring 193, and first spring seat 188 by enabling the seat ring 202 and the coil spring 193 to move relative to the external surface 214 of the spring seat 190. For example, during operation, the tubular control member 130 and the second spring seat 190 move up and down relative to the central rod 186 in response to changes in pressure across the diaphragm assembly 133 in the actuator 106. This movement causes the spring 193 to cyclically expand and compress as the tubular control member 130 moves toward and away from the valve seat 104 of the cage 126. If the coil spring 193 has imperfections, the coil spring 193 and/or the first spring seat 188 can undergo side loading due to uneven perimeter loading of the spring 193.

The movable seat ring 202 of the second spring seat 190 and the movable upper portion 193a of the spring 193, however, advantageously counteract such perimeter loading by pivoting, articulating, rotating, and otherwise self-adjusting their positions relative to the spring seat adaptor 200 according to the varying perimeter forces generated by the spring 193. As such, side loading of the spring 193 and first spring seat 188 can be reduced, which in turn can reduce wear and increase the useful life of the spring 193 and the first spring seat 188.

Another advantage of the disclosed design is that it provides for easier assembly over conventional designs. Specifically, to assemble the positioning device assembly 138 disclosed herein, a technician can first attach the first spring seat 188 to the second end 186b of the central rod 186 and position the rod 186 into the tubular control member 130. The spring 193 can then be dropped into the tubular control member 130 and positioned about the rod 186. The seat ring 202 can then be positioned on the spring 193 such that the alignment surface 218 fits into and the seating surface 216 engages the upper portion 193a of the spring 193. Finally, the technician can then place the aperture 212 in the rod receiving portion 208 of the spring seat adaptor 200 onto the first end 186a of the central rod 186, which will cause the external surface 214 of the seating portion 206 to engage the internal surface 220 of the seat ring 202.

So positioned, the threads 210 on the fixation portion 204 of the spring seat adaptor 200 can then be tightened into the threads 141 on the inner surface 143 of the tubular control member 130. While tightening the spring seat adaptor 200 into the tubular control member 130, the spring seat adaptor 200 is rotated relative to the spring 193 and seat ring 202. In conventional designs, the torque applied to the spring seat would transfer directly to the spring, thereby frustrating the alignment of the spring and making tightening of the spring seat difficult, especially when the spring required pre-loading. With the design disclosed herein, however, the amount of torque transferred to the spring 193 from tightening the spring seat adaptor 200 into the tubular control member 130 is reduced because the seat ring 202 directly engages the spring 193 and the spring seat adaptor 200 is specifically designed to be able to rotate relative to the seat ring 202 while generating minimal friction. Accordingly, the assembly process of the disclosed positioning device assembly 138 is much easier than conventional positioning device assemblies.

Furthermore, in addition to the advantages discussed thus far, the spring compression design could be utilized to accomplish various spring set points in the field. For example, in the field, the cap plate 117 could easily be removed from the upper actuator casing 122, the spring seat adaptor 200 could then be removed from the tubular control member 130, and the seat ring 202 could be replaced with a different seat ring 202 having a different thickness dimension, for example, for pre-loading the spring 193 a different amount. Moreover, the spring 193 itself could be removed and replaced with a different spring having a different spring force. Further still, the compression of the spring 193 can be adjusted by adjusting the axial position of the second spring seat 190 relative to the tubular control element 130, which can easily be done by partly unthreading or further threading the spring seat adaptor 202 therein.

While the external surface 214 of the spring seat adaptor 200 disclosed herein has been described as being convex partial spherical, and the internal surface 220 of the seat ring 202 has been described as being concave partial spherical with a radius of curvature equal to a radius of curvature of the external surface 214, alternative embodiments could be configured differently. For example, in one alternative embodiment the external surface 214 and internal surface 220 could be convex and concave, respectively, but not necessarily partial spherical.

In another embodiment, the radius of curvatures of the external and internal surfaces 214, 220 could be different. For example, the radius of curvature of the external surface 214 on the spring seat adaptor 200 could be greater than the radius of curvature of the internal surface 220 of the seat ring 202. So configured, the seat ring 202 could also pivot relative to the spring seat adaptor 200 without creating any friction, but rather, the external surface 214 could advantageously act as a fulcrum, for example.

In another embodiment, the external surface 214 of the spring seat adaptor 200 could be convex, but the internal surface 220 of the seat ring 202 may include a circular edge such that only a line contact between the seat ring 202 and the spring seat adaptor 200 exists. In still another embodiment, the external surface of the spring seat adaptor 200 could be concave or even flat.

In yet another embodiment, the second spring seat 190 could include an anti-friction component disposed between the seat ring 202 and the spring seat adaptor 200 to reduce friction and facilitate movement of the seat ring 202. The anti-friction component could include a nylon ring, for example, or a layer of graphite, a layer of lubricant, a layer of Teflon, etc.

While the foregoing has described various embodiments, features, and components of a regulator and a positioning device assembly for such a regulator, the invention is not intended to be limited to the specifics described, but rather is intended to be defined by what a person having ordinary skill in the art would understand is the contribution to the art.

What is claimed:

1. A positioning device assembly for regulating the flow of a fluid through a fluid flow-path of a regulator, the positioning device assembly comprising:
    a tubular control member;
    a central rod disposed at least partly within the tubular control member and adapted to be fixed to a casing of the regulator;
    a first spring seat disposed within the tubular control member and fixed relative to the central rod;
    a second spring seat at least partly disposed within the tubular control member and defining an opening through which the central rod extends; and
    a spring disposed between the first and second spring seats, the spring adapted to bias the tubular control member into a predetermined position relative to the casing of the regulator, wherein
    the second spring seat comprises a spring seat adaptor fixed relative to the control member and a seat ring engaging an upper portion of the spring and adapted for displacement relative to the spring seat adaptor to thereby self-align the spring within the tubular control member, the seat ring having opposing first and second axial ends and the spring seat adaptor extending axially beyond each of the first and second axial ends such that the spring seat adaptor is disposed radially between the seat ring and the central rod along the entire axial dimension of the seat ring, the seat ring including an L-shaped cross-section defining a seating surface and an alignment surface disposed perpendicular to each other, the seating surface engaged by the upper portion of the spring and the alignment surface disposed axially and radially inward of the upper portion of the spring,
    wherein the spring seat adaptor comprises a partial spherical convex surface and the seat ring comprises a partial spherical concave surface that engages the partial spherical convex surface of the spring seat adaptor, and wherein the partial spherical convex surface and the partial spherical concave surface have the same radii of curvature.

2. The assembly of claim 1, wherein the seat ring articulates relative to the spring seat adaptor.

3. A regulator, comprising:
    a valve body defining a flow-path for a fluid;
    an actuator casing coupled to the valve body;
    a tubular control member at least partly disposed within the actuator casing and adapted for displacement relative to the valve body for regulating a flow of the fluid through the flow-path;
    a central rod disposed at least partly within the tubular control member and fixed to the actuator casing;
    a first spring seat disposed within the tubular control member and fixed relative to the central rod;
    a second spring seat at least partly disposed within the tubular control member and defining an opening through which the central rod extends; and
    a spring disposed between the first and second spring seats, the spring biasing the tubular control member into a predetermined position relative to the actuator casing, wherein
    the second spring seat comprises a spring seat adaptor fixed relative to the tubular control member and a seat ring engaging an upper portion of the spring and adapted for displacement relative to the spring seat adaptor to thereby self-align the spring within the tubular control member, the seat ring having opposing first and second axial ends and the spring seat adaptor extending axially beyond each of the first and second axial ends such that the spring seat adaptor is disposed radially between the seat ring and the central rod along the entire axial dimension of the seat ring, the seat ring including an L-shaped cross-section defining a seating surface and an alignment surface disposed perpendicular to each other, the seating surface engaged by the upper portion of the spring and the alignment surface disposed axially and radially inward of the upper portion of the spring,
    wherein the spring seat adaptor comprises a partial spherical convex surface and the seat ring comprises a partial spherical concave surface that engages the partial spherical convex surface of the spring seat adaptor, and wherein the partial spherical convex surface and the partial spherical concave surface have the same radii of curvature.

4. The regulator of claim 3, wherein the seat ring articulates relative to the spring seat adaptor.

* * * * *